United States Patent Office 3,116,549
Patented Jan. 7, 1964

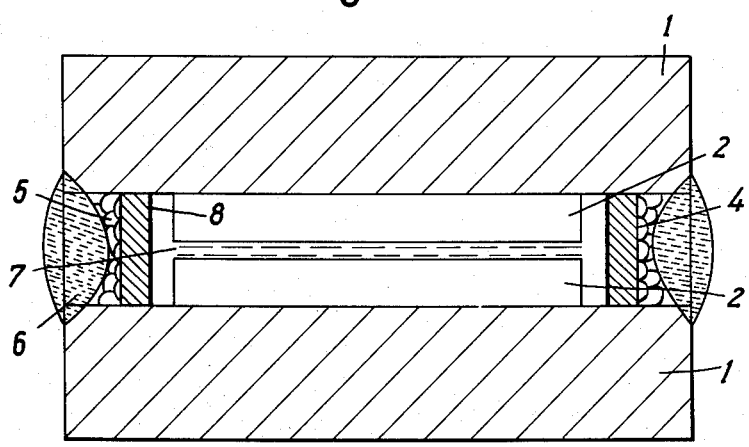
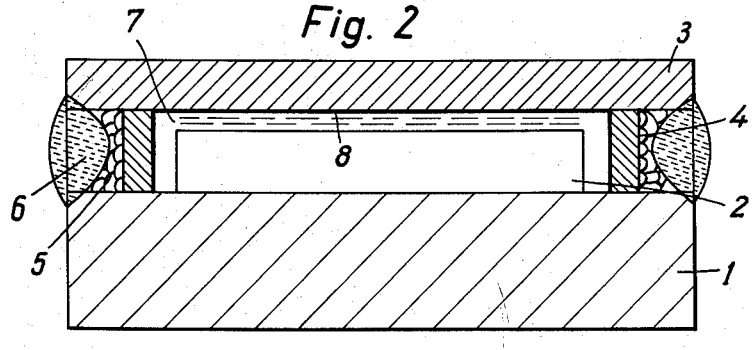

3,116,549
PROCESS FOR THE PRODUCTION OF
CLAD PRODUCTS
Kurt Born, Muelheim (Ruhr), Wilhelm Janssen, Lintorf, near Dusseldorf, and Werner Feldkamp and Wilhelm Radeker, Muelheim (Ruhr), Germany, assignors to Phoenix-Rheinrohr Aktiengesellschaft Vereinigte Hütten- und Rohrenwerke, Dusseldorf, Germany, a German corporation
Filed Feb. 10, 1960, Ser. No. 7,804
Claims priority, application Germany Feb. 14, 1959
10 Claims. (Cl. 29—471.5)

This invention relates to the cladding of metals and, more particularly, the invention relates to the roll-weld cladding of metal into a single integral metal bar, slab, plate, sheet or the like, after the so-called cladding packet formed of the base metal to be clad and the cladding layer therefor, as a gas-tight assembly, has been heated to the rolling temperature.

The so-called cladding packet comprises at least one sheet of the base metal and at least one sheet of the cladding layer, the two differing from each other in their chemical composition as well as chemical and physical properties. At least one element of the cladding packet is of a ferrous material and is preferably composed of iron, steel or alloy steel. The other element of the cladding packet, i.e. the cladding layer, may also be composed of a ferrous material of another composition, as for example an austenitic stainless steel or ferritic steel or of a non-ferrous material or alloy, as for example nickel, copper or Monel.

Cladding of this type has been described, for example, in the "Werkstoff-Handbuch Stahl und Eisen," 1953, Verlag Stahleisen G.m.b.H., Dusseldorf, P.O. 100.

Cladding packets consisting of at least one of the two layers (base and covering) are known to the art. Recently (co-pending application Serial No. 821,028), there has been described a packet of the said type distinguished by a novel separation agent for use in preventing the welding together of two juxtaposed cladding layers or of the cladding layer and cover plate. In the known cladding packets, oxidation of the contacting surfaces of the sheets or plates to be joined is prevented by, for example, the introduction of a reducing or inert gas into the packet or by evacuating the packet of any gas contained therein. Recently, it has been suggested that there be placed in the assembly oxygen and nitrogen absorbing or binding means.

It is essential that, if a final product of desired properties be obtained, any oxidation of the metallic surfaces to be joined in the subsequent welding be avoided. The known procedures in this regard were unsatisfactory, in that oxidation was not completely prevented or the same could be prevented only by the installation and maintenance of considerable heavy-duty equipment.

An object of the instant invention is a process for the production of a single integral metal bar, slab, plate, sheet or the like from chemically different metallic elements, wherein oxidation of the contacting surfaces is substantially prevented.

A further object of the instant invention is to provide in a cladding assembly comprising at least a base metal and cladding layer, which may be employed in metal-cladding operations, materials which, when heated to a temperature considerably below the ensuring deformation temperature, readily react with any oxygen or nitrogen present in the packet, thus ensuring that no oxidation of the contacting surfaces of the cladding layer and base metal can take place.

These and further objects can be appreciated from the description which follows, taken in conjunction with the drawing, in which FIG. 1 shows a cladding packet, wherein two sheets each of the base metal and of the coating metal are assembled in a gas-tight packet in accordance with the invention; and FIG. 2 shows a cladding packet, wherein one sheet each of the base metal and of the coating metal are assembled together with a cover plate in a gas-tight packet in accordance with the invention.

In accordance with the invention, it has now been found that, if in the cladding packet or assembly there is included a material or materials capable of reacting with nitrogen and oxygen and if said material is adherently fixed onto an inner surface of an outer part of the cladding packet and if after the packet or assembly has been completely sealed the said materials are brought to a temperature at which they readily and rapidly react with nitrogen and oxygen, care being taken that the metallic elements of the assembly per se are not essentially heated and thereafter the packet is heated to deformation temperature and at this temperature deformation is effected, then substantially no oxidation of the contacting surfaces joined together in the deformation takes place.

In accordance with the invention, the materials for reacting with the nitrogen and oxygen, as for example cerium, magnesium, aluminum or alloys or mixtures thereof are arranged in the packet, but outside the metals to be clad. They are affixed in form of a thin layer on the lid or the frame built-up from the filler bars, generally spoken, at those places where heat coming from an external source as by a flame, burner, or furnace or an induction coil brings the material to reaction temperatures, prior to the heating of the cladding elements to deformation temperature. The foregoing heating of the parts of the packet where reaction materials are arranged, and the following heating of the cladding materials may be effected either separately or continuously.

The operating with the materials for reacting with the nitrogen and oxygen to reaction temperature may, in accordance with the invention, be effected most advantageously in the following manner: The materials are securely affixed in the form of thin sheet-like layers to the inside of the lid or frame, or both, of the assembly. The affixing may be particularly effectively accomplished by the procedures followed in metal-spraying operations. The thickness of the layer of coating need only amount to some thousandths of a millimeter. The thin layer of the materials for reacting with the nitrogen and oxygen, when applied by the process of metal-spraying, are through-out in excellent metallic contact with the frame walls, which are to be externally heated, as for example with a burner, so that any nitrogen or oxygen gases present in the assembly are effectively eliminated by reaction with the sprayed material before the cladding materials reach the temperature at which reaction with the gases would occur, and which would lead to the formation of a separating layer. Since the sprayed layer covers the entire inner aspect of the lid and/or frame, or at least substantial portions thereof, and since there is formed by the metal-spraying a roughened surface, the oxygen and nitrogen material layer thus applied offers to the gases present a very large reaction surface.

It is particularly advantageous to spray the material having high affinity to oxygen and nitrogen onto the filler bars, thereafter to seal the packet by running tightening welding seams along the filler bars and finally to heat the filler bars and the adherent material as aluminum by a very big weld (as shown in the drawings by numeral 6). In such a case no other particular heating of the aluminum sprayed parts is necessary. It is, of course, an advantage that the material for reacting the nitrogen and oxygen gases be applied to the filler bars or frame, or cover, by metal-spraying. The metal-spraying affords the advantage that the materials for reacting with the nitrogen and oxygen are fixed in the assembly, whereby handling and transportation of the same is facilitated. A further advantage of the process in accordance with the invention is that the reacting material not only reacts with the gases on being heated, but also diffuses into the iron-containing material. At no time is there any formation of a liquid phase in accordance with the invention, which would have the undesirable consequence of leading to brittleness or product fragility. If the material selected for reaction with nitrogen and oxygen is one having only a small carbon solubility, for example aluminum, said material further prevents carbon from migrating out of the lid or frame consisting of steel, into the cladding materials. In these cases the carbon from the frame or lid (cover) does not become reduced to form a gaseous product, as for example the formation of methane, by the reaction of a carbon with the hydrogen given off in the heating of the surface of the materials being worked. The prevention of this carbon migration has the greatest significance in the cladding of chromium-nickel steels which, as is well known, tend after a slight carburization to intercrystalline corrosion. The carbon migration may be more effectively prevented if in addition there is applied, as by spraying onto the inside of the frame or lid of the assembly and before application of the material for reacting with the nitrogen and oxygen, a metal which forms with the carbon a very stable compound and which will not readily decompose on heat to release the carbon. Metals, which may be used for combining with the carbon and thus prevent migration, i.e. diffusion, of the same, include molybdenum, steel with carbide-forming components (tantalum/niobium, titanium) or with a chromium content of above 12%. In accordance with the process of the invention, there is obtained a most satisfactorily clad product, even with the heretofore most difficult roll-weld and pressure-welding combinations. The assemblies prepared in accordance with the invention may, after the step whereby the materials are heated to a temperature at which they react with nitrogen and oxygen, readily be transferred to any furnace, as for example a soak-pit, and rapidly brought to the temperature required for deformation.

The amount of the material required for reacting with the nitrogen and oxygen depends on the material selected and, of course, on the size of the cladding packet or assembly. In general, from about 30–200 g. of aluminum or other metal are required to ensure substantial elimination of nitrogen and oxygen from the packet. The amounts in the upper ranges, i.e. from about 150–200 g., are generally only required when a part of this material is to act additionally as a reactant for the carbon, which is to be prevented from migrating from the steel used in the lid or frame, etc. to the cladding metal. In such instances, if the material, i.e. aluminum, is sprayed, the thickness of the sprayed-on layer should amount to about 1/100 mm., while, if carbon migration is not to be specifically prevented, a layer of about 5/1000 mm. would be sufficient.

In the drawings, FIG. 1 shows a cladding assembly, wherein 1 is used to designate the relatively thick slabs of the base metal, preferably steel. One of the slabs of base metal constitutes in this embodiment the lower and the other upper limits of the cladding assembly. Between the two base metal slabs 1, 1 are placed two slabs 2, 2 of a coating or cladding layer, consisting of a non-ferrous metal or of steel of another composition, the contacting surfaces between each of the slabs 1 and 2 having been metallically cleaned prior to their insertion in the assembly. To prevent the welding together of the coating slabs 2, 2 to each other, there is positioned between the contacting surfaces of slabs 2, 2 a separation agent 7. This separation agent, for example, may comprise a watery suspension of calcium oxide and magnesium oxide or may consist of a textile fabric of high melting point glass fibers. Around the slabs 2, 2, which are shorter than the slabs 1, 1, filler bars 4 are welded into place and serve to box up the assembly in a gas-tight fashion. The material used for reacting with the nitrogen and oxygen contained in the assembly is designated 8. In this instance it is inserted in metal-spray form directly onto the inner surface of the filler bars 4, 5 designates the welding used to join slabs 1 and filler bars 4, thus making the assembly gas-tight, while 6 represents the cover layer, which is laid around the cladding packet.

The embodiment in FIG. 2 differs from that shown in FIG. 1 in that only one base layer 1 and one cladding layer 2 are involved in the packet. 3 designates a cover plate which is used to seal the packet, separation agent 7 being inserted between the adjacent surfaces of layer 2 and cover plate 3. Additionally, the filler bars 4 are welded to slab 1 and cover plate 3, thereby forming an air-tight assembly.

It can be appreciated from the drawings that, when heat is applied to the filler bars 4 during the running of the thick weld, the same heat is readily and directly communicated to the material designated 8, sprayed onto the filler bars 4 and the cover plate 3. It is, of course, possible in accordance with the invention not to spray the inner aspect of the filler bars 4 but only the cover 3 with the material which is to react with the nitrogen and oxygen. In this case heat applied to the packet for instance in a normal furnace for heating packets of this kind in conventional manner, first of all will penetrate through the relatively thin cover 3 and bring the material 8 to a temperature of reaction with oxygen at a time when heat has not yet substantially reached the cladding slab 2.

The following example is given by way of illustration and not limitation:

*Example*

A slab of steel, containing 0.17% C, 1.1% Mn, 0.038% P, 0.027% S, 0.28% Si and 0.032% Al, with 350 mm. thickness and 1750 mm. length and width, respectively, was covered with a sheet plate of another steel, 75 mm. shorter on each side than the base metal, and 28 mm. thick, having the composition 0.05% C, 0.80% Mn, 0.012% P, 0.018% S, 0.46% Si, 17.5% Cr, 12.3% Ni, 0.48% Cb and 2.45% Mo.

The contact surfaces were carefully cleaned. A fabric of quartz glass fibers was laid upon the alloy steel plate in a quantity of 250 g. per square meter and manufactured of fibers 4/1000 mm. thick. Filler bars were laid on the base metal corners and a 100 mm. thick cover plate consisting of low carbon steel superimposed. The inside surface of the filler bars was covered with a thin layer of 120 g. aluminum. Sealing welds were run all around the four sides of the assembly. Thereafter, a thick covering layer (numeral 6) was laid upon the sealing welds, whereby the filler bars became heated to a temperature of about 550° C. Then the packet was heated to 1280° C. and rolled with seven-fold deformation; the end roll temperature was 1050° C. After rolling, the cover plate was removed. The cladding sheet had a base metal thickness of 50 mm. and a cladding metal thickness of 4 mm., i.e. a total thickness of 54 mm.

We claim:

1. In the process for the production of clad products in which at least one ferrous base metal layer and one cladding metal layer selected from the group consisting of a ferrous metal of different characteristics than the base metal layer, non ferrous metals and alloys of non ferrous metals are assembled in a sealed cladding packet and subjected to deformation after heating, the improvement which comprises including in said packet at least one member selected from the group consisting of cerium, manganese, aluminum, alloys and mixtures thereof, capable of reacting with nitrogen and oxygen, affixing said group member in the form of a thin layer adjacent the inner surface of one of the outer walls of the cladding packet not constituting a surface of one of said metal layers, sealing said cladding packet, applying heat to said metal group member from an external heat source, causing said metal group member to be brought to a temperature at which the same rapidly and readily reacts with the nitrogen and oxygen present in said sealed packet, said temperature being lower than the temperature required for the reaction of said cladding layer and said base metal layer with nitrogen and oxygen but being sufficient to effect reaction of said metal group member with the oxygen and nitrogen present in said sealed packet, thereafter heating said packet to the temperature at which deformation is to be effected and effecting deformation.

2. Improvement according to claim 1, wherein said metal group member is affixed onto the inner surface of one of the walls of the cladding packet by spraying.

3. Improvement according to claim 2, wherein said layer has a thickness of from 1/100 mm. to 5/1000 mm.

4. Improvement according to claim 1, wherein said metal group member capable of reacting with nitrogen and oxygen is used an amount of from 30 to 200 g.

5. Improvement according to claim 1, wherein said metal group member capable of reacting with nitrogen and oxygen is used in an amount of from 30 to 150 g.

6. Improvement according to claim 1, wherein said metal group member capable of reacting with nitrogen and oxygen is aluminium.

7. Improvement according to claim 1, which comprises applying on to the inner surface of one of the walls of the cladding packet a carbide forming metal, said metal group member capable of reacting with nitrogen and oxygen being superimposed with respect to said material capable of reacting with carbon.

8. Improvement according to claim 7, wherein said carbide forming metal is molybdenum.

9. Improvement according to claim 7, wherein said carbide forming metal is a steel with a chromium content of above 12%.

10. Improvement according to claim 1, wherein said heating of said metal group member is effected by applying heat to the external aspect of the wall adjacent which said group member is arranged.

References Cited in the file of this patent

UNITED STATES PATENTS

| | | |
|---|---|---|
| 1,886,615 | Johnson | Nov. 8, 1932 |
| 1,956,818 | Acre | May 1, 1934 |
| 1,997,538 | Armstrong | Apr. 9, 1935 |
| 2,414,923 | Batcheller | Jan. 28, 1947 |
| 2,416,400 | Mehl | Feb. 25, 1947 |
| 2,745,172 | Townsend | May 15, 1956 |
| 2,758,368 | Ulam | Aug. 14, 1956 |